United States Patent [19]

Lai

[11] Patent Number: 4,933,799

[45] Date of Patent: Jun. 12, 1990

[54] HIGHLY EFFICIENT OVER CURRENT CIRCUIT BREAKER

[76] Inventor: Chin Fay Lai, No. 61, Tzu Li Street, Wu Ryh, Taichung, Taiwan

[21] Appl. No.: 250,844

[22] Filed: Sep. 29, 1988

Related U.S. Application Data

[63] Continuation-in-part of Ser. No. 123,877, Nov. 23, 1987, abandoned.

[51] Int. Cl.$^5$ .............................................. H02H 3/08
[52] U.S. Cl. ........................................ 361/25; 361/29; 361/31; 361/94; 361/102
[58] Field of Search ...................... 361/87, 93, 103, 23, 361/25, 27, 28, 29, 31, 94

[56] References Cited

U.S. PATENT DOCUMENTS 4,541,029  9/1985  Ohyama ................................ 361/31
4,717,984  1/1988  Henry et al. ..................... 361/103 X Primary Examiner—Derek S. Jennings
Attorney, Agent, or Firm—Birch, Stewart, Kolasch & Birch

[57] ABSTRACT

A highly efficient over current circuit breaker for an electric system is provided with a timer which is adjustable and can be set to produce a first control signal a predetermined time after the electric system is turned on, and a load detector in association with an over current control device which produces a second control signal when the load applied to the electric system exceeds a predetermined level. The first control signal and second control signal jointly activate an amplifier to produce a third control signal which activates relays to cause a magnetic switch to open, or "trip", whereby the electric system is turned off. The timer allows an electric surge to occur in the electric system without causing the magnetic switch to trip during the period of starting the electric system. The circuit breaker is particularly useful in systems having induction motors in which starting current surges are common.

8 Claims, 1 Drawing Sheet

HIGHLY EFFICIENT OVER CURRENT CIRCUIT BREAKER

This application is a continuation-in-part application of U.S. patent application No. 123,877 filed on Nov. 23, 1987, which is now abandoned.

BACKGROUND OF THE INVENTION

Conventional over current circuit breakers are normally so set to cut off the power supply when the current through an electric system exceeds a predetermined level which is normally set at 1.5 to 2 times the rated capacity of the electric system. However, if the electric system involves induction motors, the system often draws a relatively large amount of electric current, which is normally regarded as a starting current, which acts as a surge, at the starting period, usually within 15–20 seconds after the system is turned on. The starting current is often as large as 5–9 times the rated capacity of the system and would cause the over current circuit breaker to "trip", if the over current circuit breaker were set at 1.5 to 2 times the rated capacity of the system, and so the system will never operate normally. If the over current circuit breaker is set at a level to allow the system to draw an electric current as large as the starting current, the over current circuit breaker will not "trip" even when the system is overloaded or a short-circuit takes place, and will thus fail to protect the system from damage.

In view of the aforesaid problems with conventional over current circuit breakers, the present invention offers a highly efficient over current circuit breaker which will not "trip" when the electric system is turned on but will "trip" when the system is overloaded or a short-circuit takes place.

SUMMARY OF THE INVENTION

This invention presents an over current circuit breaker which includes a main switch for turning on and turning off an electric system, a magnetic switch connected in series with the main switch, a power relay for operating the magnetic switch, a timer for producing a first control signal a predetermined time after the main switch is closed to turn on the electric system, a load detector for detecting the magnitude of the load of the electric system, an over current control device operable in association with the load detector for producing a second control signal when the load detector detects an over-current drawn by the electric system, an amplifier operable by the first control signal in cooperation with the second control signal for producing a third control signal, and a first microrelay operable by the third control signal for supplying power to the power relay to activate the power relay, which in turn causes the magnetic switch to "trip".

In operation, the main switch and the magnetic switch are manually closed to turn on the electric system. A predetermined time thereafter the timer produces a first control signal, the predetermined time being selected to allow the electric system to operate from the starting point to the normal operating speed so that the "surge" of the starting current will have diminished when the first control signal is produced. When the electric system draws an excessive current, or when the system is overloaded, the over current control device then produces a second control signal which acts in cooperation with the first control signal to cause the amplifier to produce a third control signal. The third control signal then activates the first microrelay, which then activates the power relay, which then causes the magnetic switch to "trip" so as to disconnect power from the electric system.

In a preferred embodiment a thermal detector is provided to detect the temperature of the electric system. When the temperature of the electric system reaches a predetermined level, the thermal detector produces a signal to activate a second microrelay which then activates the first microrelay to activate the power relay and the magnetic switch to cut off the power supply.

DETAILED DESCRIPTION OF THE INVENTION

Figure 1:
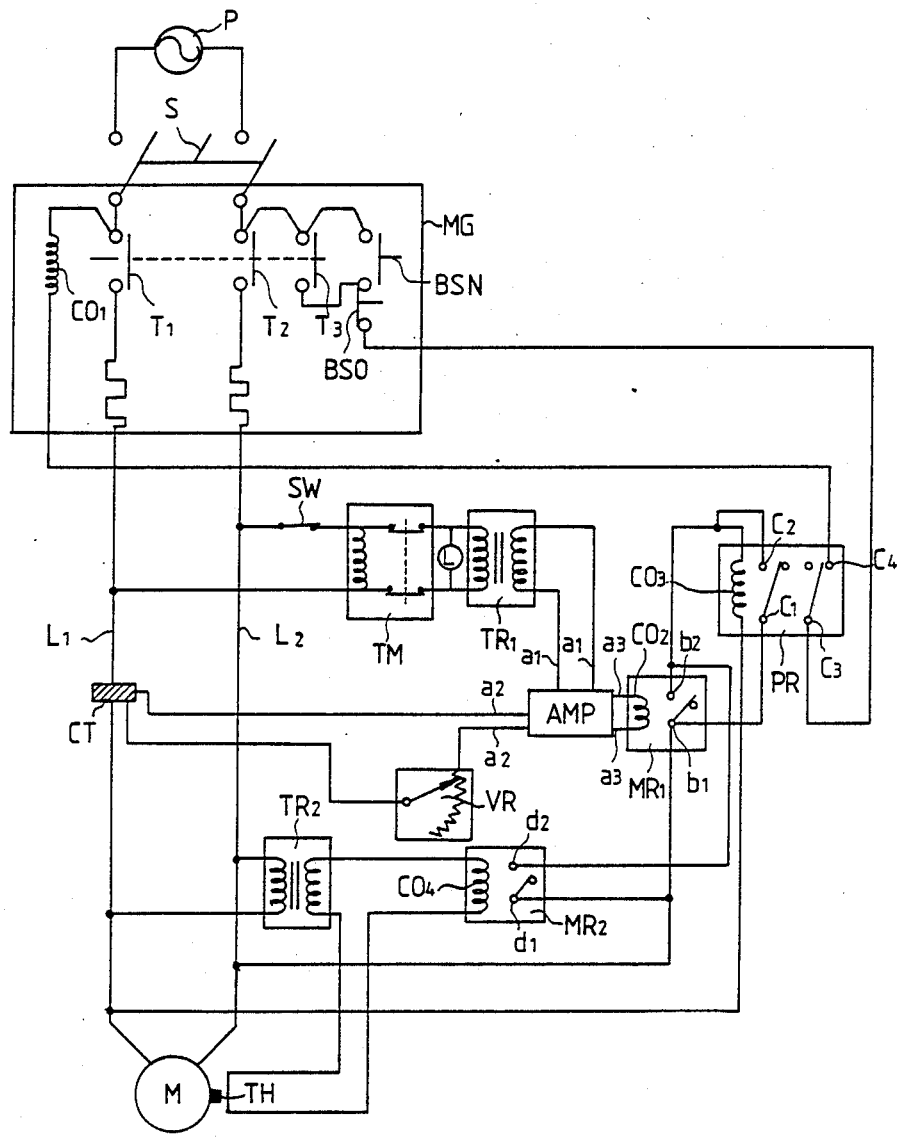
FIG. 1 is a circuit diagram of an embodiment of the over current circuit breaker of this invention.

As shown in FIG. 1, the over current circuit breaker of this invention includes a main switch S for supplying power from a power source P to an electric system M, a magnetic switch MG connected in series with main switch S, a power relay PR adapted to operate magnetic switch MG, a timer TM for producing a first control signal a predetermined time after main switch S and magnetic switch MG are closed to turn on electric system M, a load detector CT for detecting the magnitude of the load applied to electric system M and producing a voltage, an overcurrent control device VR for proportional to the detected load magnitude receiving the voltage from load detector CT and producing a second control signal when the voltage exceeds a predetermined level, an amplifier AMP operable by the first control signal in cooperation with the second control signal to produce a third control signal, and a first microrelay MR1 operable by the third control signal to operate power relay PR to cause magnetic switch MG to "trip".

As shown in the drawing, timer TM is shunted between a pair of power supply lines L1 and L2 through a switch SW, timer TM having two output terminals connected to a transformer TR1 which has a pair of output lines a1-a1 connected to amplifier AMP. An indicator lamp L is shunted across the two output terminals of timer TM. Timer TM is adjustable and is so set to produce a first control signal at the two output terminals at a predetermined time, which may be 20 seconds for example, after power is supplied to electric system M through the pair of power supply lines L1 and L2, and the first control signal is outputted to amplifier AMP through transformer TR1.

Load detector CT may be a coil which is adapted to produce a voltage in proportion to the load applied to electric system M. Over current control device VR, which may be a variable resistor, receives the voltage from load detector CT and produces a second control signal when the load applied to electric system M exceeds a predetermined level, which may be 1.5 times the rated capacity of electric system M. Load detector CT and over current control device VR are connected in series, and have a pair of common output lines a2-a2 connected to amplifier AMP.

First microrelay MR1 has a solenoid CO2 shunted across two output terminals a3-a3 of amplifier AMP, and a pair of contact points b1-b2 shunted between the power supply lines L1-L2 through a solenoid CO3 of power relay PR. Contact points b1-b2 are normally open and will be closed when solenoid CO2 is energized.

Power relay PR has a first pair of contact points C1-C2 which are normally open, and a second pair of contact points C3-C4 which are normally closed. When solenoid CO3 is energized, first contact points C1-C2 are caused to close to form a holding circuit (i.e. a bypass) for solenoid CO3, and a second contact points C3-C4 are caused to open so as to de-energize solenoid CO1 of magnetic switch MG.

Magnetic switch MG has a first button switch BSN controlling two switches T1-T2 connected to power supply lines L1-L2, and another switch T3 connected in series with a second button switch BSO which is connected in series with second pair of contact points C3-C4 of power relay PR and solenoid CO1 of magnetic switch MG.

In operation, main switch S is turned on manually and the first button switch BSN is pushed in by hand to close switches T1, T2 and T3. Since second contact points C3-C4 of power relay PR are normally closed and second button switch BSO is also normally closed, solenoid CO1 is energized to hold switches T1-T3 in a closed position, and at the same time power from power source P is supplied to electric system M through power supply lines L1-L2 during a predetermined time period, which may be 20 seconds, after the system M is turned on, timer TM remains inactive and therefore no signal will be produced by timer TM. During this period a "surge" of electric current may occur in power supply lines L1-L2 to cause load detector CT and over current control device VCR to produce a second control signal to amplifier AMP; however, because of the absence of the first control signal from timer TM, amplifier AMP will not be activated, so that the electric surge is allowed to diminish within the predetermined time period and to allow electric system M to start until it operates at a rated capacity, or within a predetermined load level, so that the second control signal from load detector CT and over current control device VR diminishes within the predetermined time period.

After the predetermined period timer TM acts to produce a first control signal which is delivered to amplifier AMP through transformer TR1. However, at this time the second control signal from load detector CT and over current control device VR due to the starting surge has already diminished, therefore amplifier AMP will not be activated.

When electric system M is overloaded or a short-circuit takes place during operation, or when electric system M draws an excessive electric current, load detector CT and over current control device VR act to deliver a second control signal to amplifier AMP, which is also receiving the first control signal from timer TM. Amplifier AMP is then activated to deliver a third control signal to energize solenoid CO2 of first microrelay MR1, and as a result contact points b1-b2 are closed, so as to energize solenoid CO3 of power relay PR. Consequently first pair of contact points C1-C2 of power relay PR is caused to close to form a holding circuit, and second pair of contact points C3-C4 is caused to open, so as to de-energize solenoid CO1 of magnetic switch MG. As a result switches T1, T2 and T3 of magnetic switch MG are caused to open, or "trip", so as to cut off the supply of power from power source P to electric system M.

The over current circuit breaker of this invention is optionally provided with an overheat protection device which includes a thermal detector TH for detecting the temperature of electric system M and delivering a temperature signal when the temperature of electric system M rises above a predetermined level, a second microrelay MR2 having solenoid CO4 to be energized by the temperature signal from thermal detector TH and a pair of contact points d1-d2 which is normally open but will be closed when solenoid CO4 is energized. Contact points d1-d2 are connected in parallel with contact points b1-b2 of first microrelay MR1. A transformer TR2 is provided to supply power from power supply lines L1-L2 to thermal detector TH. When the temperature of electric system M rises above a predetermined level, thermal detector TH acts to deliver a temperature signal to activate second microrelay MR2 which then activates power relay PR, and consequently magnetic switch MG is caused to "trip".

Although an over current circuit breaker for a single-phase electric system has been illustrated, it is to be understood that the over current circuit breaker of this invention is readily applicable to a three-phase electric system.

Tests have been conducted to measure the response time of the over current circuit breaker of this invention to compare with a conventional over current circuit breaker. The test reveal that the response time (that is the time lapsed from the time point the system is overloaded to the time point the over current circuit breaker "trips") of the over current circuit breaker of this invention is much shorter than that of the conventional over current circuit breaker. Test data are shown in Table I.

As is apparent from the above description, timer TM can be adjusted to set a time delay which allows a "surge" of electric current to occur and diminish during the starting period of the electric system, so that the overcurrent circuit breaker can be used in electric systems of any capacity. Furthermore, the arrangement of amplifier AMP in association with microrelay MR1 and power relay PR renders a highly efficient performance over any conventional over current circuit breaker, and also enables the reduction of the size of the breaker.

TABLE I

| Hp of the System (220 V) tested | Current Rating (A) | | Conventional Over Current Circuit Breaker | | | Present Over Current Circuit Breaker | | |
|---|---|---|---|---|---|---|---|---|
| | | | 1.5 X Rating | 2 X Rating | 5 X Rating | 1.5 X Rating | 2 X Rating | 5 X Rating |
| 3 HP | 9 | C | 13.5 | 18 | 45 | 13.5 | 18 | 45 |
| | | T | 10 min | 4 min | 45 sec. | 0.23 sec. | 0.21 sec. | 0.15 sec. |
| 5 HP | 15 | C | 22.5 | 30 | 75 | 22.5 | 30 | 75 |
| | | T | 10 min | 4 min | 45 sec. | 0.23 sec. | 0.21 sec. | 0.15 sec. |
| 10 HP | 30 | C | 45 | 60 | 150 | 45 | 60 | 150 |

TABLE I-continued

| Hp of the System (220 V) tested | Current Rating (A) | Tests for Response Time | | | | | |
|---|---|---|---|---|---|---|---|
| | | Conventional Over Current Circuit Breaker | | | Present Over Current Circuit Breaker | | |
| | | 1.5 X Rating | 2 X Rating | 5 X Rating | 1.5 X Rating | 2 X Rating | 5 X Rating |
| | T | 10 min | 4 min | 45 sec. | 0.22 sec. | 0.21 sec. | 0.15. |

C: Current, in ampare
T: Response time

What is claimed is:

1. An over current circuit breaker, comprising:
   main switching means manually operable to turn on and turn off power from a power source to an electric system through power supply lines;
   magnetic switch means connected in series with said main switch means;
   timing means for producing a first control signal a predetermined time after said electric system is supplied with power;
   load detecting means for detecting the magnitude of the load applied to said electric system;
   over current control means for producing a second control signal when said load detecting means detects a load that exceeds a predetermined level;
   amplifier means responsive to said first control signal and said second control signal for producing a third control signal only upon receipt of both first and second control signals;
   power relay means for causing the magnetic switch to open, thereby disconnecting said power source from said electrical system; and
   first microrelay means for activating the power relay means in response to the third control signal.

2. An over current circuit breaker as recited in claim 1, further comprising:
   thermal detecting means for producing a temperature signal when the temperature of said electric system rises above a predetermined level; and
   second microrelay means responsive to said temperature signal for activating said first microrelay means.

3. An over current circuit breaker, comprising:
   switching means for connecting a power source to an electric system;
   timing means for producing a first control signal a predetermined time after the electric system is supplied with power;
   load detecting means for detecting the magnitude of the load applied to the electric system and producing a second control signal when the load exceeds a predetermined level;
   means for producing a third control signal only upon receipt of both the first and second control signals;
   power relay means for causing the magnetic switch to open and thereby disconnecting the power source from the electrical system; and
   first microrelay means for activating the power relay means in response to the third control signal.

4. An over current circuit breaker, as claimed in claim 3, further comprising:
   thermal detector means for producing a temperature signal when the temperature of the electric system rises above a predetermined level; and
   second microrelay means responsive to the temperature signal for activating the first microrelay means.

5. A method of safeguarding a system against overloading or short-circuiting comprising the steps of:
   (a) connecting a power source to an electric system through power supply lines by means of a switch;
   (b) producing a first control signal a predetermined time after the electric system is supplied with power;
   (c) detecting the magnitude of the load applied to the electric system;
   (d) producing a second control signal when the magnitude is detected to exceed a predetermined level;
   (e) producing a third control signal only upon receipt of both the first and second control signals;
   (f) activating a power relay, by means of a first microrelay, in response to the third control signal; and
   (g) causing a magnetic switch to open, in response to the activation of the power relay, thereby disconnecting the power source from the electric system.

6. A method as claimed in claim 5, further comprising the steps of:
   (h) producing a temperature signal when the temperature of the electric system rises above a predetermined level; and
   (i) activating the first microrelay in response to the temperature signal.

7. A method of safeguarding a system against overloading or short circuiting comprising the steps of:
   (a) connecting a power source to an electric system;
   (b) producing a first control signal a predetermined time after the electric system is supplied with power;
   (c) detecting the magnitude of the load applied to the electric system;
   (d) producing a second control signal in response to the load exceeding a predetermined level;
   (e) producing a third control signal only upon receipt of both the first and second control signals;
   (f) activating a power relay, by means of a first microrelay, in response to the third control signal;
   (g) causing a magnetic switch to open in response to the activation of the power relay; and
   (h) disconnecting the power source from the electric system in response to the magnetic switch opening.

8. A method as claimed in claim 7, further comprising the steps of:
   (i) producing a temperature signal when the temperature of the electric system rises above a predetermined level; and
   (j) activating the first microrelay in response to the temperature signal.

* * * * *